Patented Mar. 2, 1954

2,671,052

UNITED STATES PATENT OFFICE 2,671,052

METHYL ACETATE DISTILLATION

Robert L. Mitchell and James W. Walker, Corpus Christi, Tex., assignors to Celanese Corporation of America, New York, N. Y., a corporation of Delaware No Drawing. Application November 13, 1951, Serial No. 256,123

4 Claims. (Cl. 202—39.5)

This invention relates to the separation of organic compounds and relates more particularly to an improved process for the separation of methyl acetate from a mixture of organic compounds.

An object of this invention is the provision of an efficient process for the separation of methyl acetate from a mixture of organic compounds containing methyl acetate and including propionaldehyde, acetone, methanol and other alcohols.

Other objects of this invention will appear from the following detailed description.

In many industrial operations or processes, mixtures of organic compounds are formed. Normally, these mixtures, for obvious economic reasons, are not discarded but are subjected to some subsequent treatment in order that the mixtures may be separated into the various components present. One such mixture is obtained as a crude fraction during the treatment of the product of the liquid phase oxidation of aliphatic hydrocarbons, such as n-butane or isobutane, for example. This crude fraction comprises a mixture of methyl acetate, propionaldehyde, acetone, methanol and other alcohols. The separation of the methyl acetate from this mixture by an ordinary straight distillation is not feasible because of the several azeotropes formed and other methods are required if the desired separation is to be effected in an efficient and economical manner.

We have now found that methyl acetate may be separated satisfactorily from such a mixture of organic compounds comprising essentially propionaldehyde, acetone, methanol and other alcohols, by subjecting the mixture to an extractive distillation employing water as the extracting agent. The methyl acetate is found to distill over and is obtained as the overhead product while the remainder of the organic compounds is recovered from the column in which the distillation is carried out as an aqueous bottom product.

In order to carry out the novel distillation process of our invention, the crude mixture of organic compounds is charged to a fractionating column provided with suitable bubble cap trays or packing to insure satisfactory vapor-liquid contact and water is fed into the column above the point or above the tray at which the feed containing the methyl acetate is introduced. By introducing water in the column at a rate sufficient to maintain the concentration of water in the liquid phase on the upper column trays at from about 50 to 75% by weight, an excellent separation may be achieved with the methyl acetate remaining behind in the aqueous bottom product being so small as to be undetectable by chemical analysis.

Reflux ratios of from 5 to 1 up to about 10 to 1 may be employed. Preferably, the water concentration is maintained at 67% by weight in the liquid phase on the upper trays of the column with a reflux ratio of 6 to 1 being employed.

In order further to illustrate the novel process of our invention but without being limited thereto the following example is given:

Example 2 parts by weight per minute of a crude mixture containing 50% by weight of methyl acetate, 5% by weight of propionaldehyde, 33% by weight of acetone, 10% by weight of methanol and other alcohols, and 2% by weight of water is fed to a 50-tray distilling column at the 20th tray from the top and 10 parts by weight per minute of water are introduced into the column at about the 5th tray from the top. The concentration of water in the liquid phase on the upper trays is about 67% by weight. The reflux is maintained at a rate of 5 parts by weight per minute and methyl acetate is taken off overhead at a rate of 1 part by weight per minute. A small amount of acetone comes over with the methyl acetate under these conditions. The distillate contains 91% by weight of methyl acetate and 6% by weight of acetone. During a continuous operation of 8 hours, it is found that about 99% of the methyl acetate introduced into the system with the crude aqueous feed is recovered in the overhead product. The aqueous mixture separated from the base of the column may be subjected to separate distillation in order to remove the acetone, methanol, propionaldehyde and other organics contained therein.

It is to be understood that the foregoing detailed description is given merely by way of illustration and that many variations may be made therein without departing from the spirit of our invention.

Having described our invention, what we desire to secure by Letters Patent is:

1. Process for the separation of methyl acetate from a mixture of organic compounds containing methyl acetate, propionaldehyde, acetone, methanol and other alcohols, which comprises subjecting said mixture of organic compounds to an extractive distillation employing water as the extractant and taking methyl acetate off as the overhead product, the residual aqueous mixture containing substantially all of the propionaldehyde of said mixture of organic compounds.

2. Process for the separation of methyl acetate from a mixture of organic compounds containing methyl acetate, propionaldehyde, acetone, methanol and other alcohols, which comprises subjecting said mixture of organic compounds to an extractive distillation employing water as the extractant, maintaining the concentration of water at from about 50 to 75% by weight in the liquid phase and taking methyl acetate off as the overhead product, the residual aqueous mixture containing substantially all of the propionaldehyde of said mixture of organic compounds.

3. Process for the separation of methyl acetate from a mixture of organic compounds containing methyl acetate, propionaldehyde, acetone, methanol and other alcohols, which comprises subjecting said mixture of organic compounds to an extractive distillation employing water as the extractant, maintaining the concentration of water at from about 50 to 75% by weight in the liquid phase and the reflux ratio at 5 to 10 to 1, and taking methyl acetate off as the overhead product, the residual aqueous mixture containing substantially all of the propionaldehyde of said mixture of organic compounds.

4. Process for the separation of methyl acetate from a mixture of organic compounds containing methyl acetate, propionaldehyde, acetone, methanol and other alcohols, which comprises subjecting said mixture of organic compounds to an extractive distillation employing water as the extractant, maintaining the concentration of water in the liquid phase at about 67% by weight and the reflux ratio at about 5 to 1, and taking methyl acetate off as the overhead product, the residual aqueous mixture containing substantially all of the propionaldehyde of said mixture of organic compounds.

ROBERT L. MITCHELL.
JAMES W. WALKER.

References Cited in the file of this patent

UNITED STATES PATENTS

| Number | Name | Date |
|---|---|---|
| 1,929,901 | Ricard et al. | Oct. 10, 1933 |
| 2,290,636 | Deanesly | July 21, 1942 |
| 2,514,967 | Pierotti | July 11, 1950 |
| 2,551,625 | Morrell et al. | May 8, 1951 |

OTHER REFERENCES

"Handbook of Chemistry and Physics," Twenty-eighth Edition, published 1944 by Chemical Rubber Publishing Company, 2310 Superior Avenue, Cleveland, Ohio, pages 556, 557, 972.

Maurice Lecat, "Tables Azeotropiques," Second Edition, vol. 1, published 1949 by the author, 29 Rue Auguste Danse, Brussels, Belgium, pages xi, xii, 156, 214, 352.